US007426423B2

(12) United States Patent
Schneider et al.

(10) Patent No.: US 7,426,423 B2
(45) Date of Patent: Sep. 16, 2008

(54) CRANE OR EXCAVATOR FOR HANDLING A CABLE-SUSPENDED LOAD PROVIDED WITH OPTIMISED MOTION GUIDANCE

(75) Inventors: Klaus Schneider, Hergatz (DE); Oliver Sawodny, Breitenbach (DE); Arnold Eckard, Ilmenau (DE)

(73) Assignee: Liebherr-Werk Nenzing_GmbH, Nenzing (AT)

( * ) Notice: Subject to any disclaimer, the term of this patent is extended or adjusted under 35 U.S.C. 154(b) by 284 days.

(21) Appl. No.: 10/510,427

(22) PCT Filed: May 27, 2003

(86) PCT No.: PCT/EP04/05734

§ 371 (c)(1), (2), (4) Date: Oct. 6, 2004

(87) PCT Pub. No.: WO2004/106215

PCT Pub. Date: Dec. 9, 2004

(65) Prior Publication Data

US 2006/0074517 A1 Apr. 6, 2006

(30) Foreign Application Priority Data

May 30, 2003 (DE) ................................ 103 24 692

(51) Int. Cl.

| | |
|---|---|
| ***G06F 7/00*** | (2006.01) |
| ***G05B 19/04*** | (2006.01) |
| ***G05B 19/18*** | (2006.01) |
| ***B66C 13/06*** | (2006.01) |
| ***B66C 13/16*** | (2006.01) |
| ***B66C 13/18*** | (2006.01) |
| ***B66C 15/06*** | (2006.01) |
| ***B66C 23/88*** | (2006.01) |

(52) U.S. Cl. ....................... 700/213; 700/218; 700/253; 212/272; 212/274; 212/276

(58) Field of Classification Search ................. 700/213, 700/214, 218, 245, 250, 253, 256; 212/272–276
See application file for complete search history.

(56) References Cited

U.S. PATENT DOCUMENTS 5,526,946 A * 6/1996 Overton ...................... 212/275

(Continued)

FOREIGN PATENT DOCUMENTS

DE 4025 749 2/1992

(Continued)

*Primary Examiner*—Gene O. Crawford
*Assistant Examiner*—Ramya G Prakasam
(74) *Attorney, Agent, or Firm*—Dilworth & Barrese, LLP

(57) ABSTRACT

The invention refers to a crane or excavator for the transaction of a load, which is carried by a load cable with a turning mechanism for the rotation of the crane or excavator, a seesaw mechanism for the erection or incline of an extension arm and a hoisting gear for the lifting or lowering of the load which is carried by a cable with an actuation system. The crane or excavator has, in accordance with the invention, a track control system, whose output values are entered directly or indirectly as input values into the control system for position or speed of the crane or excavator, whereas the set points for the control system in the track control are generated in such a way that a load movement results from it with minimized oscillation amplitudes.

20 Claims, 9 Drawing Sheets

U.S. PATENT DOCUMENTS

| | | | | |
|---|---|---|---|---|
| 5,908,122 | A * | 6/1999 | Robinett et al. | 212/275 |
| 5,961,563 | A | 10/1999 | Overton | |
| 6,442,439 | B1 * | 8/2002 | Robinett et al. | 700/55 |
| 6,496,765 | B1 * | 12/2002 | Robinett et al. | 701/50 |
| 7,044,314 | B2 * | 5/2006 | Nayfeh et al. | 212/270 |
| 2002/0008075 | A1 * | 1/2002 | Handroos et al. | 212/276 |

FOREIGN PATENT DOCUMENTS

| | | | |
|---|---|---|---|
| DE | 195 02 421 | | 8/1996 |
| DE | 195 09 734 | | 9/1996 |
| DE | 100 21 626 | | 6/2001 |
| DE | 100 64 182 | | 5/2002 |
| EP | 0732 999 | | 9/1996 |
| EP | 1314681 | | 5/2003 |
| EP | 1661844 | A1 * | 5/2006 |
| WO | 01/34511 | | 5/2001 |

* cited by examiner

CRANE OR EXCAVATOR FOR HANDLING A CABLE-SUSPENDED LOAD PROVIDED WITH OPTIMISED MOTION GUIDANCE

BACKGROUND OF THE INVENTION

The invention refers to a crane or excavator for the transaction of a load, which is carried by load cable in accordance with the turning mechanism for the rotation of the crane or excavator, a seesaw mechanism for the erection or incline of an extension arm and a hoisting gear for the lifting or lowering of the load which is carried by a cable with an actuation system.

The invention refers to a crane or excavator for the transaction of a load, which is carried by a load cable in accordance with the generic term of the claim 1.

The invention covers in detail the generation of set points for the control of cranes and excavators, which allows movement in three degrees of freedom for a load hanging from a cable. These cranes or excavators have a turning mechanism, which can be mounted on a chassis and which provides the turning movement for the crane or excavator. Also available is a mechanism to erect or to incline an extension arm or a turning mechanism. The crane or excavator also has a hoisting gear for lifting or lowering of the load hanging on the cable. This type of crane or excavator is used in a variety of designs. Examples are harbor mobile cranes, ship cranes, offshore cranes, crawler mounted cranes or cable-operated excavators.

An oscillation of the load starts during the transaction of a load; which is carried by a cable by such a crane or excavator. This oscillation results from the movement of the crane or excavator itself. Efforts were made in the past to reduce or eliminate the oscillation of such load cranes.

WO 02/32805 A1 describes a computer control system for oscillation damping of the load for a crane or excavator, which transfers a load carried by a load cable. The system includes a track planning module, a centripetal force compensation device and at least one axle controller for the turning mechanism, one axle controller for the seesaw mechanism, and one axle controller for the hoisting gear. The track planning module only takes the kinematical limitations of the system into consideration. The dynamic behavior will only be considered during the design of the control system.

SUMMARY OF THE INVENTION

It is the objective of this invention to further optimize the movement control of the load carried by a cable.

To solve this issue, a crane or excavator, which falls into this category, has a control system, which generates the set points for the control system in such a way, that it results in an optimized movement with minimized oscillation amplitude. This can also include traveled track predictions of the load, and a collision avoidance strategy can also be implemented.

Beneficial designs of the invention are a result of the main claim and the resulting sub claims.

It is especially beneficial, that optimal control trajectories are calculated and updated in real time for track control of the invention at hand. Control trajectories, based on a reference trajectory linearized model, can be created. The model based optimal control trajectories can alternatively be based on a non-linear model approach.

The model based optimal control trajectories can be calculated by using feedback from all status variables.

The model based optimal control trajectories can alternatively be calculated by using feedback of at least one measuring variable and an estimate of the other actual variables.

The model based optimal control trajectories can also alternatively be calculated by using feedback of at least one measuring variable and tracking of the remaining actual variables by a model based forward control system.

The track control can be implemented as fully automatic or semi-automatic.

This, together with a control system for load oscillation damping, results in an optimal movement behavior with reduced residual oscillation and smaller oscillation amplitude during the drive. The required sensor technology at the crane can be reduced without the control system. A fully automated operation, with pre-determined start and arrival point, can be implemented as well as a hand lever operation, which will be called semi-automatic in the following.

The set point function of the invention at hand, in contrast to WO 02/32805 A1, will be generated in such a way, that the dynamic behavior of the crane will be taken into consideration before the control system gets switched on. This means that the control system has only the function to compensate for model and variable deviations, which results in a better driving performance. The crane can be operated with this optimized control function only and the control system can be completely eliminated, if the position accuracy and the tolerable residual oscillation permit this. The behavior, however, will be a little less optimal, if compared to the operation with the control system, since the model does not comply in all details with the real conditions.

The process has two operational modi. The hand lever operation, which allows the operator to pre-determine a target speed by using the hand lever deflection, and the fully automated operation, which works with a pre-determined start and arrival point.

The optimized control function calculation can in addition be operated on its own or in combination with a control system for load oscillation damping.

Brief Description of the Drawings

Other details and advantages of the invention are explained in the application example shown in the drawing. The invention will be described here using the example of a harbor mobile crane, which is a typical representative of a crane or an excavator as described in the beginning.

Other details and advantages of the invention are explained in the application example shown in the drawing. The invention will be described here using the example of a harbor mobile crane, which is a typical representative of a crane or an excavator as described in the beginning [sic].

Figure 1:
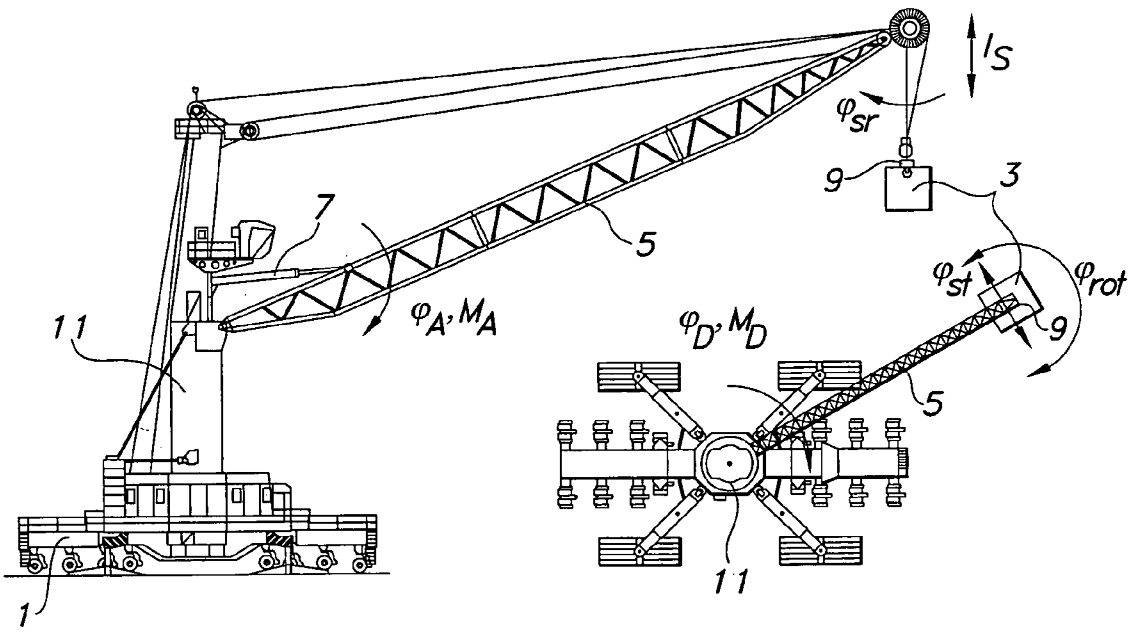

Shown are:

FIG. 1: Principal mechanical structure of a harbor mobile crane

Figure 2:
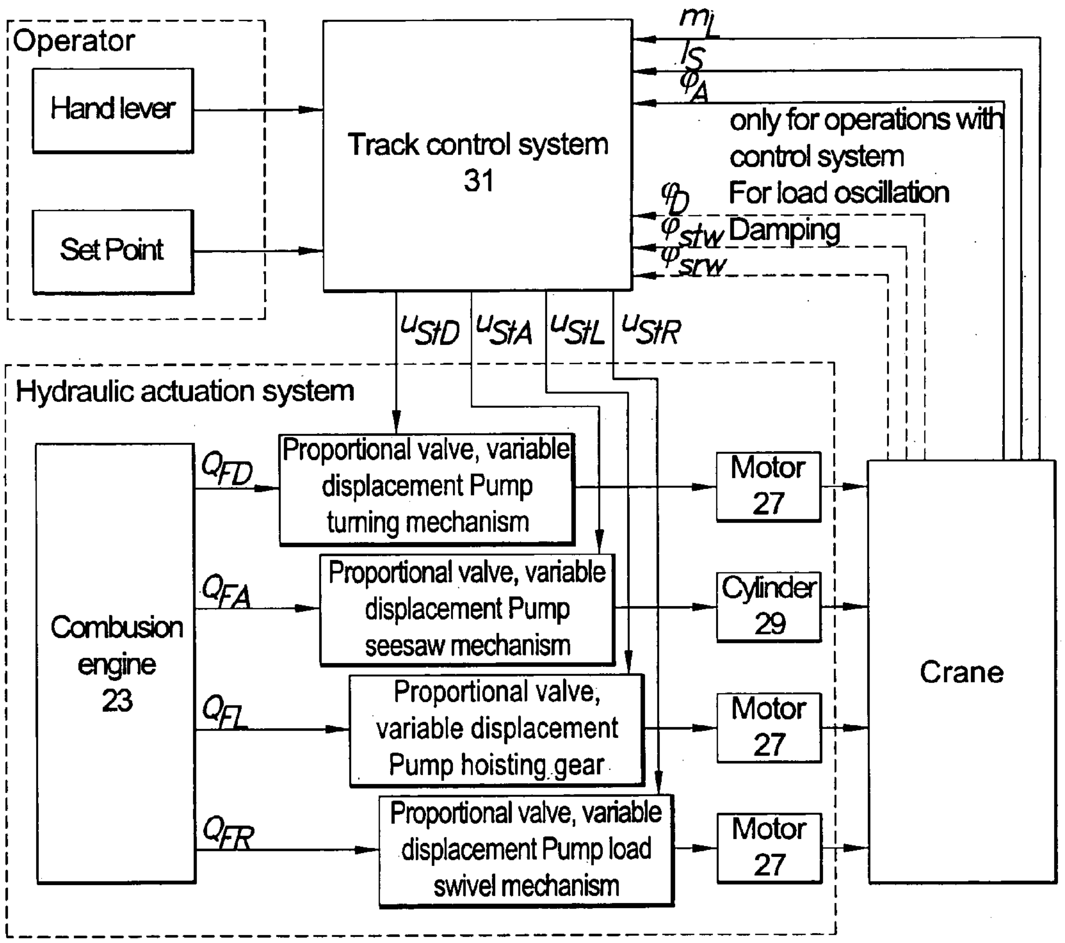

FIG. 2: Control function of the crane, consisting of the collaboration of the hydraulic control system with the track control and a module for the optimized movement guidance FIG. 3 Structure of the track control system with module for the optimized movement guidance and with a control system for load oscillation damping FIG. 4: Control function without control system for load oscillation damping consisting of the structure of the track control system with module for optimized movement guidance (if necessary with subsidiary position controllers for the motors)

Figure 5:
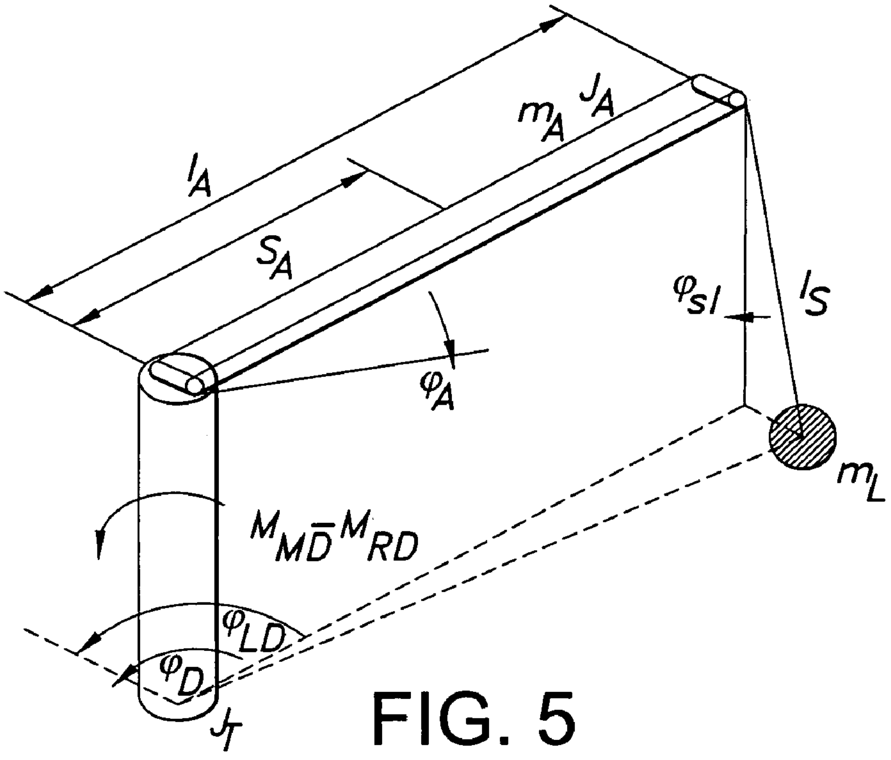

FIG. 5: Mechanical design of the turning mechanism and a definition of the model variables FIG. 6 Mechanical design of the seesaw mechanism and a definition of the model variables FIG. 7: Erection kinematics of the seesaw mechanism FIG. 8: Flow chart for the calculation of the optimized control variable during fully automated operation FIG. 9: Flow chart for the calculation of the optimized control variable during semi-automated operation FIG. 10: Example of a set point generation for fully automated operation FIG. 11: Example of time lines of control variables in a hand lever operation

Description of the Preferred Embodiments

FIG. 1 shows the principal mechanical structure of a harbor mobile crane. The harbor mobile crane is mostly mounted on a chassis 1. The extension arm 5 with the hydraulic cylinder of the seesaw mechanism 7 can be tilted by the angle $\phi_A$ to position the load 3 inside the work space. The cable length $l_s$ can be changed by using the hoisting gear. The tower 11 allows the rotation of the extension arm around the vertical axis by the angle $\phi_D$. The load can be totaled by the angle $\phi_{rot}$ using the load swivel mechanism 9.

FIG. 2 shows the collaboration of the hydraulic control system with the track control 31 with a module for the optimized movement guidance. The harbor mobile crane usually has a hydraulic drive system 21. A combustion engine 23 supplies the hydraulic control circuits via a transfer box. The hydraulic control circuits consist of a variable displacement pump 25, which is controlled by a proportional valve and a motor 27 or a cylinder 29 which act as work engines. A load pressure dependent delivery stream $Q_{FD}$, $Q_{FA}$, $Q_{FL}$, $Q_{FR}$ will be preset using the proportional valves. The proportional valves will be controlled by the signals $u_{StD}$, $u_{StA}$, $u_{StL}$, $u_{StR}$. The hydraulic control system is normally supported by an underlying delivery stream control system. It is important, that the control voltages $u_{StD}$, $u_{StA}$, $u_{StL}$, $u_{StR}$ are implemented at the proportional valves by the underlying delivery stream control system inside the appropriate hydraulic circuit into proportional delivery streams $Q_{FD}$, $Q_{FA}$, $Q_{FL}$, $Q_{FR}$.

Figure 3:
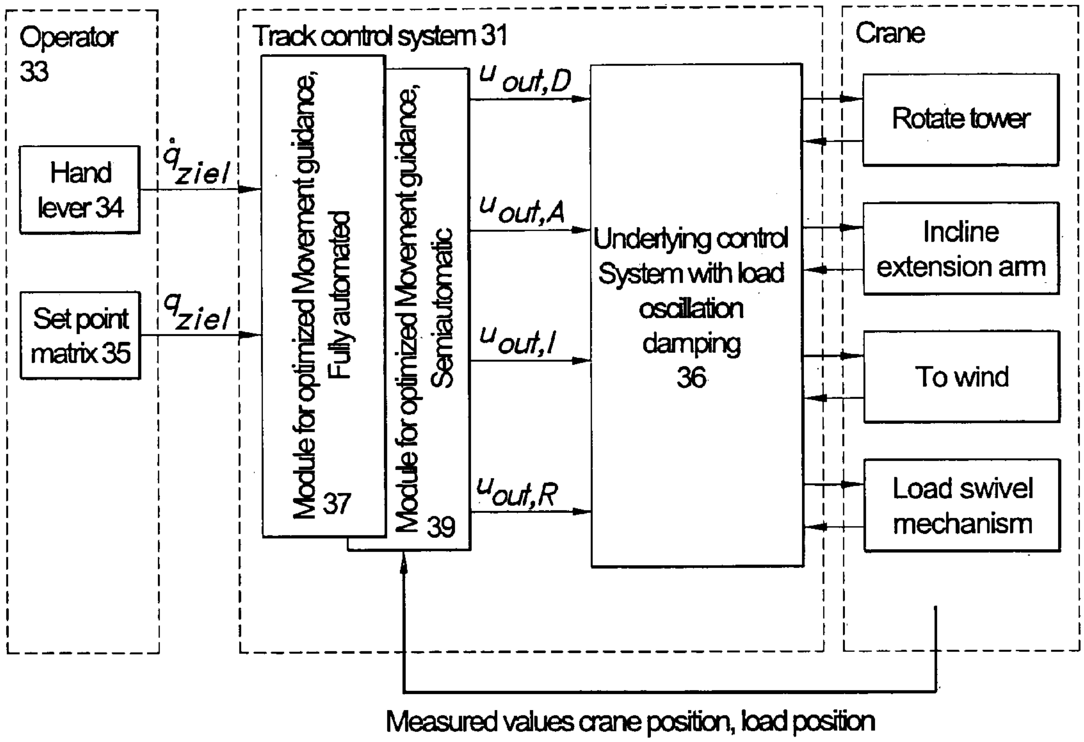
Figure 4:
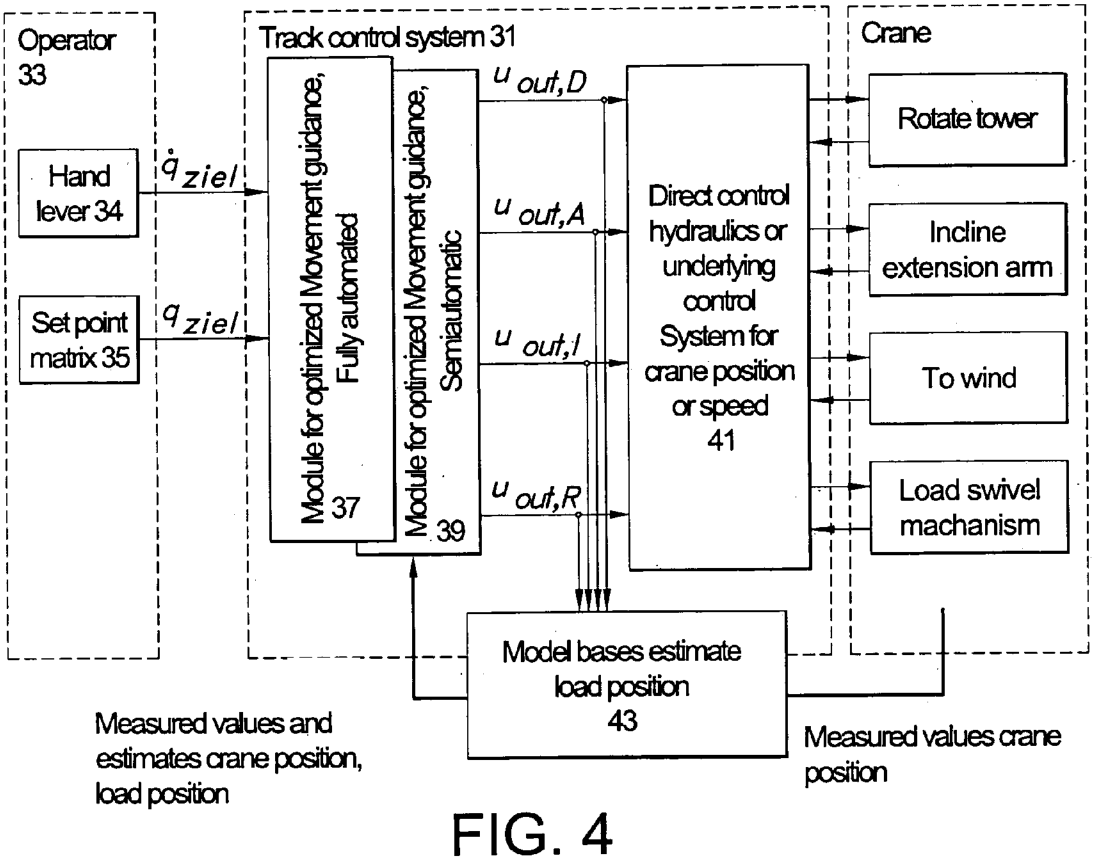

The structure of the track control system is shown in FIGS. 3 and 4. FIG. 3 shows the track control system with the module for optimized movement guidance with and with a control system for load oscillation damping and FIG. 4 shows the track control system with the module for the optimized movement guidance without control system for load oscillation damping. This load oscillation damping can be designed, for example, by following the write-up PCT/EP01/12080. This means, that the content shown in that write-up will now be integrated in this write-up.

It is important to understand that the time functions for the control voltages of the proportional valves are not derived directly from the hand levers anymore, but that they are calculated in the track control system 31 in such a way, that no or very little oscillation of the load is generated and that the load follows the desired track inside the work space. This means, that the kinematical description plus the dynamic description of the system will be included for the calculation of the optimized control variable.

The input variable of the module 37 is a set point matrix 35 for the position and orientation of the load, in its simplest form this consist of start and arrival point. The position is normally described by polar coordinates for turning cranes ($\phi_{LD}$, $r_{LA}$, l). An additional angle value can be added (rotary angle $\gamma_L$ around the vertical axis which is in parallel to the cable), since this does not describe the position of an extended body (i.e. a container) in space completely. The target variables $\phi_{LDZiel}$, $r_{LAZiel}$, $l_{Ziel}$, $\gamma_{LZiel}$ are combined in the vector $\underline{q}_{Ziel}$.

The input values of module 39 are the actual positions of the hand levers 34 for the control of the crane. The deflection of the hand levers corresponds to the desired target speed of the load in the particular movement direction. The targets speeds $\dot{\phi}_{LDZiel}$, $\dot{r}_{LAZiel}$, $\dot{l}_{Ziel}$, $\dot{\gamma}_{Lziel}$ are combined in the target speed vector $\dot{\underline{q}}_{Ziel}$.

The information about the stored model information of the dynamic behavior description and the selected constraints and side conditions can be used to solve the optimal control problem, in case of a module for the optimized movement control of a fully automated operation. Starting values are in this case the time functions $u_{out,D}$, $u_{out,A}$, $u_{out,l}$, $u_{out,R}$, which are at the same time input values for the underlying load oscillation damping control system 36, or for the underlying position or speed control system of the crane 41. A direct control 41 of the crane without underlying control system is also possible, if the formulation of equation 37 is performed accordingly. This uses the hand lever value during fully automated operation to change the side condition of the maximal permissible speed inside the optimal control problem. This gives the user the opportunity to influence the fully automated development of the speed, even in fully automated operations. The changes will be considered and implemented immediately during the next calculation cycle of the algorithm.

The modules for the optimized movement control during semi-automatic operation 39 need, however, in addition to constraints and side conditions, information for the desired speed of the load by the hand lever position, as additional information of the current system status. This means that the measured values of the crane and load positions must be continuously fed into module 39 during semi-automated operation. These are in detail:

turning mechanism angle $\phi_D$,
seesaw mechanism angle $\phi_A$,
cable length $l_S$, and
relative load hook position c The angles for the load position description are:

tangential cable angle $\phi_{St}$,
radial cable angle $\phi_{Sr}$, and
absolute rotation angle of the load $\gamma_L$.

Especially the last mentioned measuring values for cable angle and absolute rotation angle of the load are only measurable with great complexity. These are, however, are absolutely required for the realization of a load oscillation damping system, to compensate for disturbances. It guarantees a very high position accuracy with little residual oscillation even under the influence of disturbances (like wind). All of these values are available for FIG. 3.

These values must be re-constructed for the optimized movement guidance system during semi-automatic operation, however, if the process is used in a system that has no sensors for cable angle measurements and for the absolute rotation angle. This can be achieved with an estimation processes 43 as well as observation structures. They use the measuring values of the crane position and the control functions $u_{out,D}$, $u_{out,A}$, $u_{out,l}$, $u_{out,R}$ in a stored dynamic model to estimate the missing actual values and input them as feedback (see FIG. 4).

The basis for the optimized movement guiding system is the process of dynamic optimizing. This requires that the dynamic behavior of the crane be described in a differential equation model. Either the Lagrange formalism or the Newton-Euler method can be used to get to the derivative of the model equation.

Figure 6:
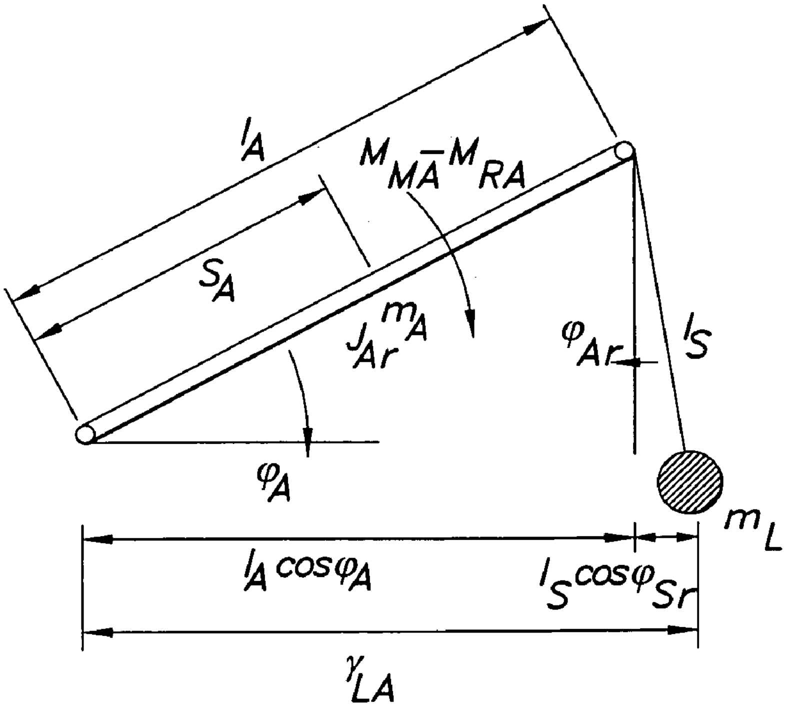

The following shows several model variables. The definitions of the model variables will be shown by using FIGS. 5 and 6. FIG. 5 shows the model variables for the rotational movement and FIG. 6 shows the model variables for the radial movement.

First FIG. 5 will be explained in detail. Important is the connection between the rotational position $\phi_D$ of the crane tower and the load position $\phi_{LD}$ in the direction of the rotation as shown. The load rotational position, corrected by the oscillation angle, is calculated as follows.

$$\varphi_{LD} = \varphi_D + \arctan\frac{l_S\varphi_{Sr}}{l_A\cos\varphi_A} \tag{1}$$

$l_S$ is the resulting cable length from the extension arm head to the load center. $\phi_A$ is the current erection angle of the seesaw mechanism. $l_A$ is the length of the extension arm and $\phi_{St}$ is the current cable angle in the tangential direction (approximation: sin $\approx\phi_{St=}\phi_{St}$, since $\phi_{St}$ is small). The dynamic system for the movement of the load in rotary direction can be described by the following differential equations.

$$\lfloor J_T+(J_{AZ}+m_As_A{}^2+m_Ll_A{}^2)\cos^2\phi_A\rfloor\ddot{\phi}_D+m_Ll_Al_s\cos\phi_A\ddot{\phi}_{st}\div b_D\dot{\phi}_D=M_{MD}=M_{RD} \tag{2}$$

$$m_Ll_Al_S\cos\phi_A\ddot{\phi}_D+m_Ll_S{}^2\ddot{\phi}_{st}+m_Lgl_s\phi_{st}=0 \tag{3}$$

Designations:

$m_L$ mass of the load $l_S$ cable length $m_A$ mass of the extension $J_{AZ}$ mass moment of inertia of the extension arm regarding the center of gravity during rotation around the vertical axis $l_A$ length of the extension arm $S_A$ center of gravity distance of the extension arm $J_T$ mass moment of inertia of the tower $b_D$ viscose damping in the actuation $M_{MD}$ actuation moment $M_{RD}$ friction moment (2) describes essentially the movement equation for the crane tower with extension arm, which considers the feedback from the load oscillation. (3) is the movement equation, which describes the load oscillation around the angle $\phi_{St}$, in which the beginning of the load oscillation is caused by the rotation of the tower, due to the angle acceleration of the tower, or by an external disturbance, which is described by the start conditions of this differential equation.

The hydraulic actuation is described by the following equation.

$$M_{MD} = i_D\frac{V}{2\pi}\Delta p_D \tag{4}$$

$$\Delta p_D = \frac{1}{V\beta}\left(Q_{FD} - i_D\frac{V}{2\pi}\dot{\varphi}_D\right)$$

$$Q_{FD} = K_{PD}u_{StD}$$

$i_D$ is the transfer ratio between motor revolution and rotational speed of the tower, V is the consumption volume of the hydraulic motors, $\Delta P_D$ is the pressure reduction in a hydraulic motor, β is the compressibility of oil, $Q_{FD}$ is the delivery stream inside the hydraulic circuit for the rotation and $K_{PD}$ is the proportional constant, which shows the connection between the delivery stream and the control voltage of the proportional valve. Dynamic effects of the underlying delivery stream control system can be disregarded.

The transfer behavior of the actuation equipment can alternatively be described by an approximated connection as delay element of the $1^{st}$ or higher order, instead of using equation 4. The following shows the approximation with a delay element of the $1^{st}$ order. This results in the following transfer function $$s\Phi_D(s) = \frac{K_{PDAntr}}{1 + T_{DAntr}s}U_{StD}(s) \tag{5}$$

or in the time area $$\ddot{\varphi}_D = -\frac{1}{T_{DAntr}}\dot{\varphi}_D + \frac{K_{PDAntr}}{T_{DAntr}}u_{StD} \tag{6}$$

This allows building an adequate model description by using the equations (6) and (3); equation (2) is not required.

$T_{DAntr}$ is the approximate (derived from measurements) time constant for the description of the delay behavior of the actuation. $K_{PDAntr}$ is the resulting amplification between control voltage and resulting speed in a stationary case.

A proportionality between speed and the control voltage of the proportional valve can be assumed, if a negligible time constant with respect to the actuation dynamic exists.

$$\dot{\phi}_D=K_{PDdirekt}u_{StD} \tag{7}$$

An adequate model description can also be built here by using equations (7) and (3).

The movement equations for the radial movement shown in FIG. 6 can be built analogous to equations (2) and (3). FIG. 6 gives explanations for the definition of the model variables. The connection shown there between the erection angle position $\phi_A$ of the extension arm and the load position in radial direction $r_{LA}$ is essential.

$$r_{LA}=l_A\cos\phi_A+l_S\phi_{SR} \tag{8}$$

The dynamic system can be described with the following differential equation by using the Newton-Euler process.

$$(J_{AY} + m_As_A^2 + m_Ll_A^2\sin^2\varphi_A)\ddot{\varphi}_A - m_Ll_Al_s\sin\varphi_A\ddot{\varphi}_{sr} + b_A\dot{\varphi}_A - m_As_Ag\sin\varphi_A\cdot\varphi_A = M_{MA} - M_{RA} - m_As_Ag\cos\varphi_A \tag{9}$$

$$-m_Ll_Al_s\sin\varphi_A\ddot{\varphi}_A + m_Ll_s^2\ddot{\varphi}_{sr} + m_Ll_sg\varphi_{sr} = m_Ll_s\ddot{\varphi}_D^2(l_S\varphi_{sr} + l_A\cos\varphi_A) \tag{10}$$

Designations:

$m_L$ mass of the load $l_s$ cable length $m_A$ mass of the extension $J_{AY}$ mass moment of inertia with respect to the center of gravity during rotation around the horizontal axis including actuation strand $l_A$ length of the extension arm $S_A$ center of gravity distance of the extension arm $b_A$ viscose damping in the actuation $M_{MA}$ actuation moment $M_{RA}$ friction moment Equation (9) describes mainly the movement equation of the extension arm with the actuating hydraulic cylinder, which takes the feedback of the load oscillation into consideration. The gravity part of the extension arm and the viscose friction in the actuation are also considered. Equation (10) is the movement equation, which describes the load oscillation $\phi_{SR}$. The start of the oscillation is created by the erection or tilting of the extension arm via the angle acceleration of the extension arm or by an outside disturbance, shown by the initial conditions for these differential equations. The influence of the centripetal force on the load during rotation of the lead with the turning mechanism is described by the term on the right side of the differential equation. This describes a typical problem for a turning crane, since this shows that there is a link between turning mechanism and seesaw mechanism. The problem can be described in such a way, that the turning mechanism movement with quadratic rotational speed dependency creates also an angle amplitude in radial direction.

The hydraulic actuation is described by the following equations.

$$M_{MA} = F_{Zyl} d_b \cos\varphi_p(\varphi_A) \tag{11}$$

$$F_{Zyl} = p_{Zyl} A_{Zyl}$$

$$\dot{p}_{Zyl} = \frac{2}{\beta V_{Zyl}}(Q_{FA} - A_{Zyl}\dot{z}_{Zyl}(\varphi_A, \dot{\varphi}_A))$$

$$Q_{FA} = K_{PA} u_{StA}$$

$F_{Zyl}$ is the force of the hydraulic cylinder on the piston rod, $p_{Zyl}$ is the pressure in the cylinder (depending on the direction of movement: in the piston or on the ring side), $A_{Zyl}$ is the cross sectional area of the cylinder (depending on the direction of movement: in the piston or on the ring side) B is the oil compressibility, $V_{zyl}$, is the cylinder volume, $Q_{FA}$ is the delivery stream in the hydraulic circuit for the seesaw mechanism and $K_{PA}$ is the proportionality constant, which shows the connection between the delivery stream and the control voltage of the proportional valve. The dynamic effects of the underlying delivery stream control system are neglected. 50% of the total hydraulic cylinder volume will be used as relevant cylinder volume for the calculation of the oil compression. $z_{Zyl}$, $\dot{z}_{Zyl}$ are the position or the speed of the cylinder rod. These are, like the geometric parameter $d_b$ and $\phi_p$, depending on the erection kinematics.

Figure 7:
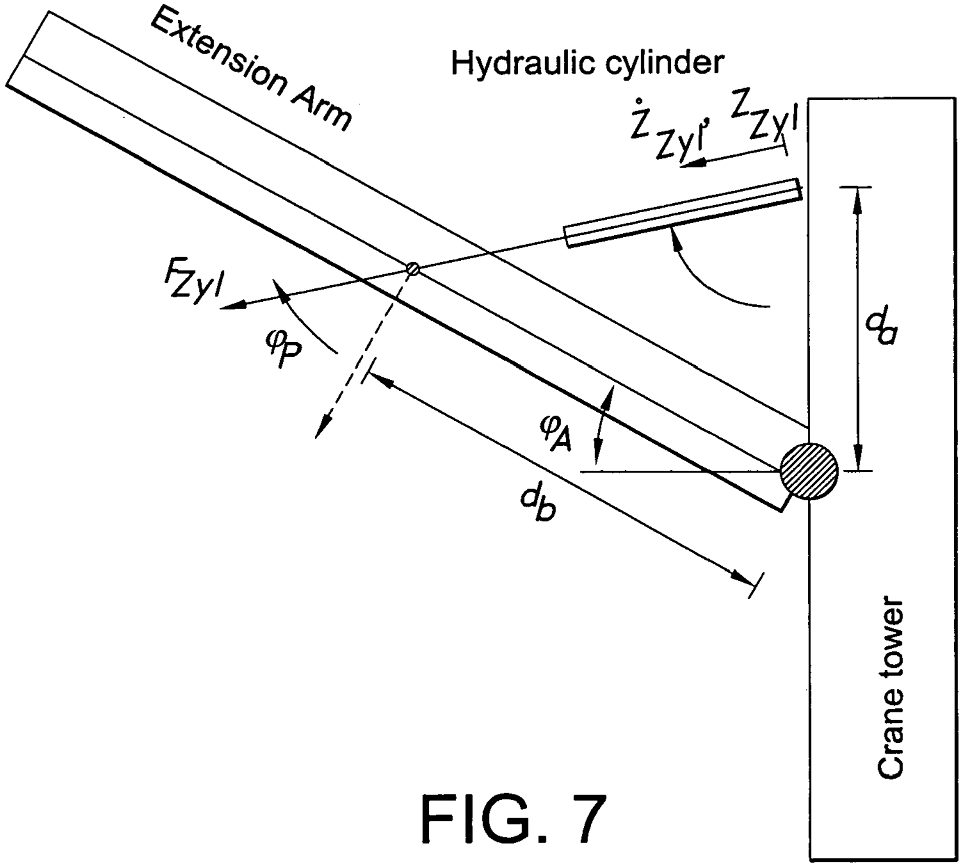

The erection kinematics of the seesaw mechanism are shown in FIG. 7. The hydraulic cylinder is, as an example, fixed above the center of rotation of the extension arm at the crane tower. The distance $d_a$ between this point and the center of rotation of the extension arm can be found in the design data. The hydraulic cylinder piston rod is connected to the extension arm at a distance $d_b$. The correction angle $\phi_0$ considers the deviations of the fixation points of the extension arm or the tower axis and can also be found in the design data. This leads to the following correlation between erection angle $\phi_A$ and hydraulic cylinder position $Z_{Zyl}$.

$$z_{Zyl} = \sqrt{d_a^2 + d_b^2 - 2 d_b d_a \sin(\phi_A - \phi_0)} \tag{12}$$

The reversed relation of (12) and the dependence between piston rod speed $\dot{z}_{Zyl}$ and erection speed $\dot{\phi}_A$ is also important, since only the erection angle $\phi_A$ is a measured value.

$$\varphi_A = \arcsin\left(\frac{d_a^2 + d_b^2 - z_{Zyl}^2}{2 d_a d_b}\right) + \varphi_0 \tag{13}$$

-continued $$\dot{\varphi}_A = \frac{\partial \varphi_A}{\partial z_{Zyl}} \dot{z}_{Zyl} = \frac{\sqrt{d_a^2 + d_b^2 - 2 d_b d_a \sin(\varphi_A - \varphi_0)}}{-d_b d_a \cos(\varphi_A - \varphi_0)} \dot{z}_{Zyl} \tag{14}$$

The calculation of the projection angle $\phi p$ is also required for the calculation of the effective moment on the extension arm.

$$\cos\varphi_p = \frac{d_a \cos(\varphi_A - \varphi_0)}{\sqrt{d_a^2 + d_b^2 - 2 d_b d_a \sin(\varphi_A - \varphi_0)}} \tag{15}$$

An approximation can be used for the dynamics of the actuation with an approximate relationship as a delay element of the $1^{st}$ order as an alternative to the hydraulic equations (1). This results for example in $$sZ_{zyl}(s) = \frac{K_{PAAntr}}{1 + T_{AAntr} s} U_{StA}(s) \tag{16}$$

or in the time area in $$\ddot{z}_{Zyl} = -\frac{1}{T_{AAntr}} \dot{z}_{Zyl} + \frac{K_{PAAntr}}{T_{AAntr}} u_{StA} \tag{17}$$

This means that an adequate model description can also be made with the help of the equations (17), (14) and (10); equation (9) is not required. $T_{AAntr}$ is the approximate (derived from measurements) time constant for the description of the delay behavior of the actuation. $K_{PAAntr}$ is the resulting amplification between control voltage and resulting speed in a stationary case.

A proportionality between speed and the control voltage of the proportional valve can be assumed if a negligible time constant with respect to the actuation dynamic exists.

$$\dot{z}_{Zyl} = K_{PAdirekt} u_{StA} \tag{18}$$

An adequate model description can also be built here by using the equations (18). (10) and (14).

The last movement direction is the rotation of the load on the load hook by the load swivel mechanism. A description of this control system is a result of the German patent DE 100 29 579 dated Jun. 15, 2000. A reference to its content is explicitly made here. The rotation of the load will be performed by the load swivel mechanism, via a hook block, which hangs on a cable, and via a load attachment. Acute torsion oscillations are suppressed. This allows the position accurate pick-up of the load, which in most cases is not rotation symmetric, the movement of the load through the strait and the landing of the load. This movement, is also integrated in the module for the optimized movement guidance, as is shown for example in the overview in FIG. 3. The load can now, as a special benefit, after the pick-up and during the transport be driven into the desired turning position via a load swivel mechanism. Pumps and motors are in this case being controlled synchronously. This modus also allows the orientation without the use of a rotation angle.

This results in the following movement equation. The variable identification is in accordance with DE 100 29 579 dated Jun. 15, 2000. A linearization was not performed.

$$(\Theta_{Lc} + \Theta_{Uc})\ddot{\gamma}_{drill} = -m_L g \sin\left(\frac{d_c \gamma_{drill}}{2 l_S}\right)\frac{d_c}{2} - \Theta_{Lc}\ddot{c} \tag{19}$$

This allows us now to establish differential equations also for the description of the actuation dynamic of the load swivel mechanism, to improve the function, which will also be included in the rotational movement. A detailed description is not given here.

The dynamic of the hoisting gear can be neglected, since the dynamic of the hoisting gear movement is fast compared to the system dynamic of the load oscillation of the crane. The dynamic equation for the description of the hoisting gear dynamic can, however, be added at any time if required, as it had been done for the load swivel mechanism.

The remaining equations for the description of the system behavior are now converted into a non-linear state space description in accordance with Isidori, Nonlinear Control Systems, Springer Verlag 1995. This will be done as an example for the equations (2), (3), (9), (10), (14), (15). The following example does not include a rotational axis of the load around the vertical axis and around the hoisting gear axis. It is, however, not difficult to include these in the model description. The application at hand assumes a crane without an automatic load swivel mechanism, and the hoisting gear will be operated manually by the crane operator for safety reasons. This results in state space description $\underline{\dot{x}}=\underline{a}(\underline{x})+\underline{b}(\underline{x})\underline{u}\underline{y}=\underline{c}(\underline{x})$ (20)

with state vector $\underline{x}=[\phi_D \dot{\phi}_D \phi_A \dot{\phi}_A \phi_{St} \dot{\phi}_{St} \phi_{Sr} \dot{\phi}_{Sr} P_{Zyl}]^T$ (21)

control variable $\underline{u}=[u_{StD} u_{StA}]^T$ (22)

starting value $\underline{y}=[\phi_{LD} r_{LA}]$ (23)

The vectors $\underline{a}(\underline{x})$, $\underline{b}(\underline{x})$, $\underline{c}(\underline{x})$ are a result of the transformation of the equations (2)–(4), (8)–(15).

There is an issue during the operation of the module for optimized movement guidance without underlying load oscillation damping, in so far as the state $\underline{x}$ must be available completely as a vector. In this case there are, however, no oscillation angle sensors installed, which means that the oscillation angle values $\phi_{St}$, $\dot{\phi}_{St}$, $\phi_{Sr}$, $\dot{\phi}_{Sr}$ must be reconstructed from the control values $u_{StD}$, $u_{StA}$ and the measured values $\phi_D$, $\dot{\phi}_D$, $\phi_A$, $\dot{\phi}_A$, $P_{Zyl}$. The non linear model of equations (20-23) will be linearized for this purpose, and a parameter adaptive status observer (see FIG. 4, block 43) will be designed. A status feedback of the cable angle values based on the model equations und the known trends of the input values and the measurable status variables can be used for reduced accuracy requirements.

The target trend for the input signal (control signals) $u_{StD}(t)$, $u_{stA}(t)$ are determined by the solution of an optimal control problem, which means by the solution of the dynamic optimization. The desired reduction of the load oscillation is acquired by a time functional. Constraints and trajectory limitations of the optimal control problem are created by the track data, the technical restrictions of the crane system (i.e. limited drive power, and limitations based on dynamic load moment, limitations to avoid tilting of the crane) and the expanded demands on the movement of the load. It is, for example, for the first time possible to predict with the following process exactly the track passage, which the load needs after the calculated control function is switched on. This provides automation opportunities, which were previously not available. Such a formulation of the optimal control problems is shown in the following example for the fully automated operation of the system with pre-determined start and arrival point of the load track and for the hand lever operation.

The total movement will be observed for the case of a fully automated operation, from the pre-determined start to the pre-determined arrival point. The load oscillation angles are rated quadratically in the target functional of the optimal control problem. The minimization of the target functional delivers therefore a movement with reduced load oscillation. An additional valuation of the load oscillation angle speeds with a time variant (increasing towards the end of the optimization horizon) penalty term results in a pacification of the load movements at the end of the optimization horizon. A regulation term with quadratic valuation of the amplitudes of the control variables can influence the numerical conditions of the problem.

$$J = \int_{t_0}^{t_f} (\varphi_{St}^2(t) + \varphi_{Sr}^2(t) + \rho(t)(\dot{\varphi}_{St}^2(t) + \dot{\varphi}_{Sr}^2(t)) + \rho_u(u_{StD}(t), u_{StA}(t)))dt \tag{24}$$

Designations:

$\bar{t}_0$ pre-determined start time $\bar{t}_f$ pre-determined end time $\rho(t)$ time variant penalty coefficient $\rho_u(u_{Std}, u_{stA})$ regulation term (quadratic valuation of the control variable)

The complete solution between pre-determined start and arrival point will not be observed during hand lever operation, but the optimal control problem will be observed in a dynamic event with a moved time window $[\bar{t}_0, \bar{t}_f]$. The starting time of the optimization horizon $\bar{t}_0$ is the current time, and the dynamics of the crane system will be observed in the prognosis horizon $\bar{t}_f$ of the optimal control problem. This time horizon is an essential tuning parameter of the process and it is limited downwards by the oscillation frequency of the oscillation period of the load oscillation movement.

The deviation of the real load speed to the target speed, which is pre-determined by the hand lever position, needs to be considered in the target functional of the optimal control problem, in addition to the target reduction of the load oscillation.

$$J = \int_{\bar{t}_0}^{\bar{t}_f} \begin{pmatrix} \rho_{LD}(\dot{\varphi}_{LD}(t) + \dot{\varphi}_{LD,soll})^2 + \rho_{LA}(\dot{r}_{LA}(t) - \dot{r}_{LA,soll})^2 + \\ \varphi_{St}^2(t) + \varphi_{Sr}^2(t) + \rho(t)(\dot{\varphi}_{St}^2(t) + \dot{\varphi}_{Sr}^2(t)) + \rho_u(u_{StD}(t), u_{StA}(t)) \end{pmatrix} dt \tag{25}$$

Designations:

$\bar{t}_0$ pre-determined start time of the optimization horizon $\bar{t}_f$ pre-determined end time of the prognosis time frame $\rho_{LD}$ valuation coefficient deviation load rotation angle speed $\dot{\phi}_{LD,soll}$ load rotation angle speed pre-determined by hand lever position $\rho_{LA}$ valuation coefficient deviation radial load speed $\dot{r}_{LA,soll}$ radial load speed pre-determined by hand lever position The pre-determined start and arrival points for the fully automated operation come from the constraints for the optimal control problem, from its coordinates and from the requirements of a rest position in start and arrival position.

$$\varphi_D(t_0)=\varphi_{D,0},\ \varphi_D(t_f)=\varphi_{D,f} \quad (26)$$

$$\dot\varphi_D(t_0)=0,\ \dot\varphi_D(t_f)=0$$

$$\varphi_A(t_0)=\arccos\left(\frac{r_{LA,0}}{l_A}\right),\ \varphi_A(t_f)=\arccos\left(\frac{r_{LA,f}}{l_A}\right)$$

$$\dot\varphi_A(t_0)=0,\ \dot\varphi_A(t_f)=0$$

$$\varphi_{St}(t_0)=0,\ \varphi_{St}(t_f)=0$$

$$\dot\varphi_{St}(t_0)=0,\ \dot\varphi_{St}(t_f)=0$$

$$\varphi_{Sr}(t_0)=0,\ \varphi_{Sr}(t_f)=0$$

$$\dot\varphi_{Sr}(t_0)=0,\ \dot\varphi_{Sr}(t_f)=0$$

Designations:

$\phi_{D,0}$ start point turning mechanism angle $\phi_{D,f}$ end point turning mechanism angle $r_{LA,0}$ start point load position $r_{LA,f}$ end point load position The constraints for the cylinder pressure come from the stationary values at the start and arrival points in accordance with equation (11).

The hand lever operation must, however, consider in the constraints, that the movement does not start from a resting position and that it generally does not end in a resting position either. The constraints at the start time of the optimization horizon $t_0$ come from the current system status $x(t_0)$, which is measured, or which is reconstructed by a parameter adaptive status observer from a model build from control values $u_{StD}$, $u_{StA}$ and measured values $\phi_D$, $\dot\phi_D$, $\phi_A$, $\dot\phi_A$, $P_{Zyl}$.

The constraints at the end of the optimization horizon $t_f$ are free.

A number of restrictions result from the technical parameter of the crane system, which have to be included in the optimal control problem, depending on the operational mode. The drive power for example is limited. This can be described via a maximal delivery stream in the hydraulic actuation and can be included into the optimal control problem via the amplitude limitation for the control variables.

$$-u_{StD,max}\leqq u_{StD}(t)\leqq u_{StD,max}$$

$$-u_{StA,max}\leqq u_{StA}(t)\leqq u_{StA,max} \quad (27)$$

The change speed of the control variables are limited to avoid undue demands on the system due to abrupt load changes. The results of the abrupt changes are not included in the simplified dynamic model described above. This limits the mechanical demand definitely.

$$-\dot u_{StD,max}\leqq \dot u_{StD}(t)\leqq \dot u_{StD,max}$$

$$-\dot u_{StA,max}\leqq \dot u_{StA}(t)\leqq \dot u_{StA,max} \quad (28)$$

It can be requested in addition, that the control variables must be continuous as a function of time and must have continuous 1st derivations regarding time.

The erection angle is limited due to the crane design.

$$\phi_{A,min}\leqq\phi_A(t)\leqq\phi_{A,max} \quad (29)$$

Designations:

$U_{StD,max}$ maximal value control function turning mechanism $\dot u_{StD,max}$ maximal change speed control function turning mechanism $U_{StA,max}$ maximal value control function seesaw mechanism $\dot u_{StA,max}$ maximal change speed control function seesaw mechanism $\phi_{A,min}$ minimal angle erection angle $\phi_{A,max}$ maximal angle erection angle Additional restrictions come from extended requirements for the movement of the load. A monotone change of the rotational angle can be required for fully automated operation, if the total load movement from start to arrival point is analyzed.

$$\dot\phi_D(t)(\phi_D(t_f)-\phi_D(t_0))\geqq 0 \quad (30)$$

Track passages can be included in the calculation of the optimal control system. This is valid for the fully automated as well as for the hand lever operation, and it is implemented via the analytical description of the permissible load position with the help of equation restrictions.

$$g_{min}\leqq g(\phi_{LD}(t),\ r(t))\leqq g_{max} \quad (31)$$

A track course inside a permissible area, in this case the track passage, is forced with the help of this in equation. The limits of this permissible area limit the load movement and represent ‘virtual walls’.

It can be included in the optimal control problem via the constraints, if the track to be traveled does not only consist of a start and an arrival point, but has also other points which have to be traveled in a pre-determined order.

$$\varphi_D(t_i)=\varphi_{D,i},\ \varphi_A(t_i)=\arccos\left(\frac{r_{LA,i}}{l_A}\right) \quad (32)$$

Designations:

$t_i$ (free) point in time when the pre-determined track point i is reached $\phi_{D,i}$ rotational angle coordinate of the pre-determined track point i $r_{LA,i}$ radial position of the pre-determined track point i The claim is not dependent on a certain method for the numerical calculation of the optimal control system. The claim includes explicitly also an approximation solution of the above mentioned optimal control problems, which calculates only a solution with sufficient (not maximal) accuracy, to achieve reduced calculation demands during a real time application. A number of the above mentioned hard limitations (constraints or trajectory equation limitations) can in addition be handled numerical as soft limitations via the valuation of limitation violation in the target functional.

However, the following explains as an example the numerical solution via a multi stage control parameterization.

The optimization horizon is handled in discrete steps to solve the optimal control problem approximately.

$$t_0=t^0<t^1<\ldots<t^K=t_f \quad (33)$$

The length of the partial interval $[t^k, t^{k+1}]$ can be adapted to the dynamics of the problem. A larger number of partial intervals normally leads to an improved approximation solution, but also requires increased calculation work.

Each of these partial intervals will be approximated by a time response of the control variable via an approach function $U^k$ with a fixed number of parameters $u^k$ (control parameter).

$$u(t)\approx u_{app}(t)=U^k(t,u^k),\ t^k\leqq t\leqq t^{k-1} \quad (34)$$

The status differential equation of the dynamic model can now be integrated numerically and the target functional can be analyzed. The approximated time responses will be used in this case instead of the control variables. The result is the target functional as a function of the control parameter $u^k$, k=0, . . . ,K−1. The constraints and the trajectory limitations can also be seen as functions of the control parameter.

The optimal control problem is thus approximated by a non-linear optimization problem in the control parameters. The function calculation for the target and the limitation analysis of the non-linear optimization problem requires in each, case the numerical integration of the dynamic model, in consideration of the approximation approach in accordance with equation (34).

This limited non-linear optimization problem can now be solved numerically and a common process of sequential quadratic programming (SQP) is used, which solves the non-linear problems with a number of linear quadratic approximations.

The efficiency of the numerical solution can be significantly increased, if in addition to the control parameters of the interval k also the start status $$x^k \approx x(t^k),\ k=0, \ldots, K \tag{35}$$

of the respective interval is used as a variable of the non-linear optimization problem. The approximated status trajectories have to be secured by adequate equation limitations. This increases the dimension of the non-linear optimization problem. A significant simplification is, however, achieved by the coupling of the problem variables and in addition a strong structuring of the non-linear optimization problem is achieved. This reduces the demand on the solution significantly, assuming that that the problem structure will be taken advantage of in the solution algorithm.

An additional significant reduction of the calculation work for solving the optimal control problem is achieved by an approximation due to the linearization of the system equations. This approach linearizes the initially non-linear status differential equations and algebraic starting equations (20) with an initially arbitrarily pre-determined system trajectory ($x_{ref}(t)$, $u_{ref}(t)$) which matches the status differential equations.

$$\Delta\dot{x}=A(t)\Delta x+B(t)\Delta u$$

$$\Delta y=C(t)\Delta x \tag{36}$$

The values Δx, Δu, Δy are deviations from the reference curve of the particular variable.

$$\Delta x=x-x_{ref},\ \Delta u=u-u_{ref},\ \Delta y=y-y_{ref}$$

$$\dot{x}_{ref}=a(x_{ref})+b(x_{ref})\cdot u_{ref}$$

$$y_{ref}=c(x_{ref}) \tag{36}$$

The time variant matrices A(t), B(t), C(t) are a result of the Jacobin matrices.

$$A(t)=\frac{\partial(a(x_{ref}(t))+b(x_{ref}(t))\cdot u_{ref}(t))}{\partial x_{ref}(t)}, \tag{38}$$

$$B(t)=b(x_{ref}(t)),$$

$$C(t)=\frac{\partial c(x_{ref}(t))}{\partial x_{ref}(t)}.$$

The optimal control assignments are now formulated in the variables Δx, Δu, which results in a limited linear quadratically optimal control problem. The status differential equation can be solved analytically via the associated movement equation on each partial interval $[t^k,t_{k-1}]$ and the complex numerical integration can be omitted, if the starting function $U^k$ is selected correctly.

The optimal control assignment is therefore approximated by a finite dimensional quadratic optimization problem with linear equation and in equation restrictions, which can be solved numerically by a customized standard process. The numeric complexity is significantly smaller than the non-linear optimization problem described above.

The linearization solution described is especially applicable for the approximated solution of the optimal control problems during hand lever operations (time window $[\bar{t}_0, \bar{t}_f]$), for which the inaccuracies due to the linearization have little influence and for which adequate reference trajectories are available, due to the optimal control and status courses calculated in the previous time steps.

The solution of the optimal control problem is the optimal time responses of the control values as well as the status values of the dynamic model. These will be plugged in as control variable and set point for operations with underlying control. These target functions take the dynamic behavior of the crane into consideration, and therefore the control system has to compensate only for disturbance values and model deviations.

The optimal responses of the control variables, however, are directly plugged in as control variables for operations without an underlying control system.

The solution of the optimal control problem delivers additionally a prognosis of the track of the oscillating load, which is usable for extended measures to avoid collision.

Figure 8:
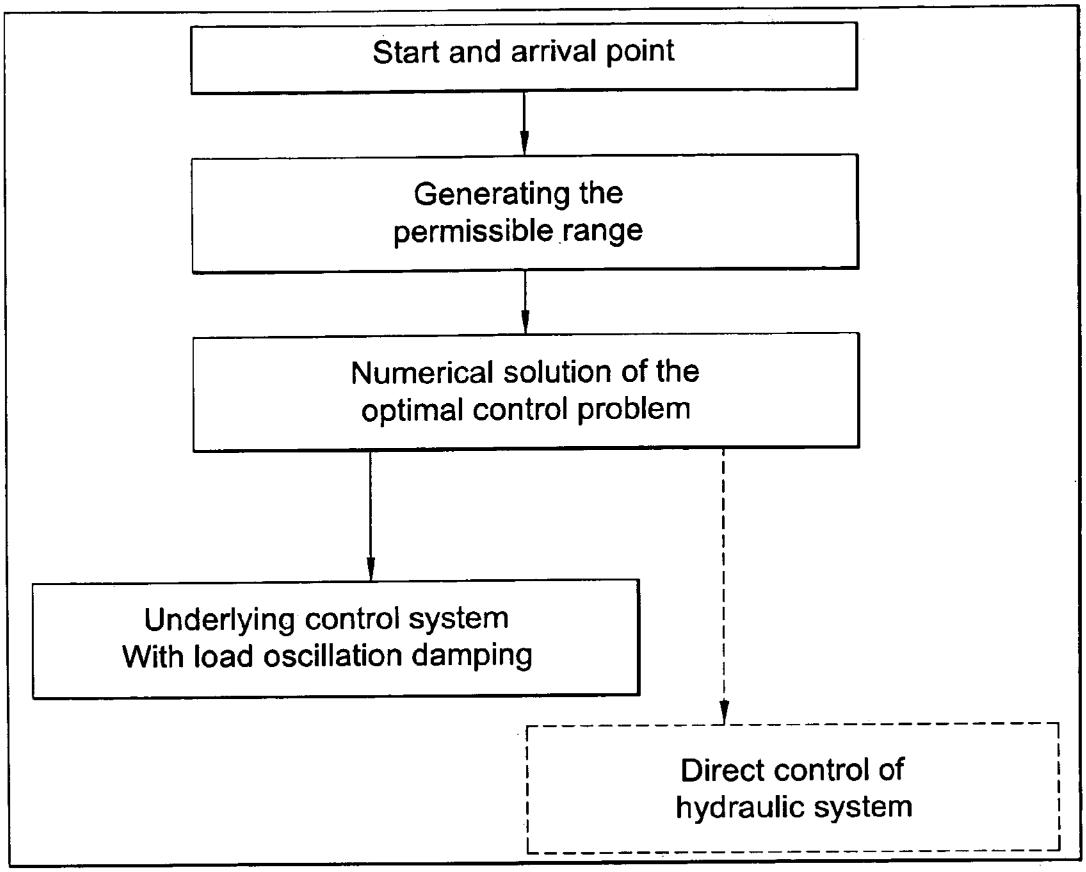

FIG. 8 shows a flow diagram for the calculation of optimized control variables in fully automated operations. This replaces module 37 in FIG. 3. The optimal control problem is defined by the inclusion of the specifications of the permissible range and the technical parameters, starting with the start and arrival points of the load movement defined by the set point matrix. The numerical solution of the optimal control problem delivers the optimal time responses of the control and status values. These are plugged in as control and set point values for underlying control systems for load oscillation damping. A realization without underlying control system—with direct plug in of the optimal control function onto the hydraulic system—can alternatively be implemented.

Figure 9:
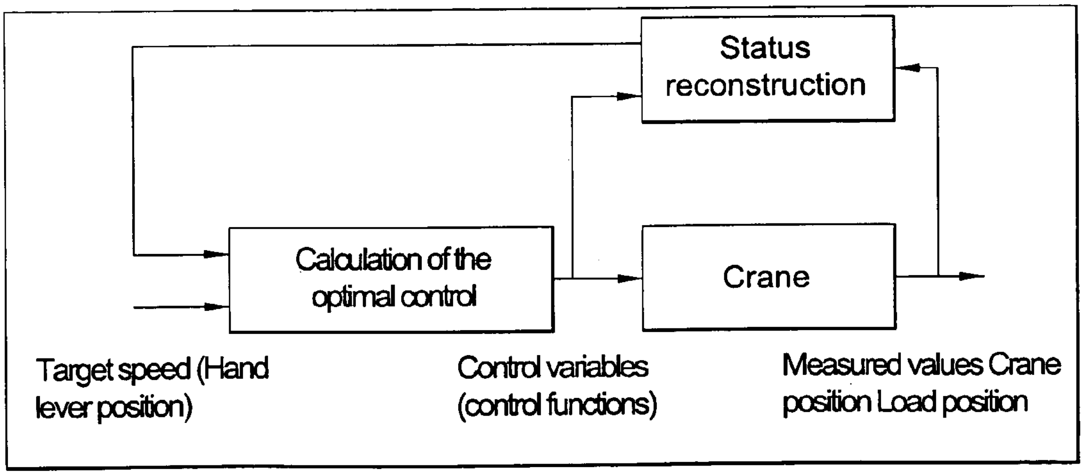

FIG. 9 shows the cooperation between the status design and the calculation of the optimal control system for a hand lever operation. The status of the dynamic crane model is tracked by using the measured values available. Time responses will be calculated by solving the optimal control problem, which under reduced load oscillation, move the load speed towards the set points generated by the hand levers.

A calculated optimal control system will not be realized across the full time horizon $[t_0, t_f]$, but will continuously be adjusted to the current system status and to the current set points. The frequency of these adjustments is determined by the required calculation time of the optimal control values.

Figure 10:
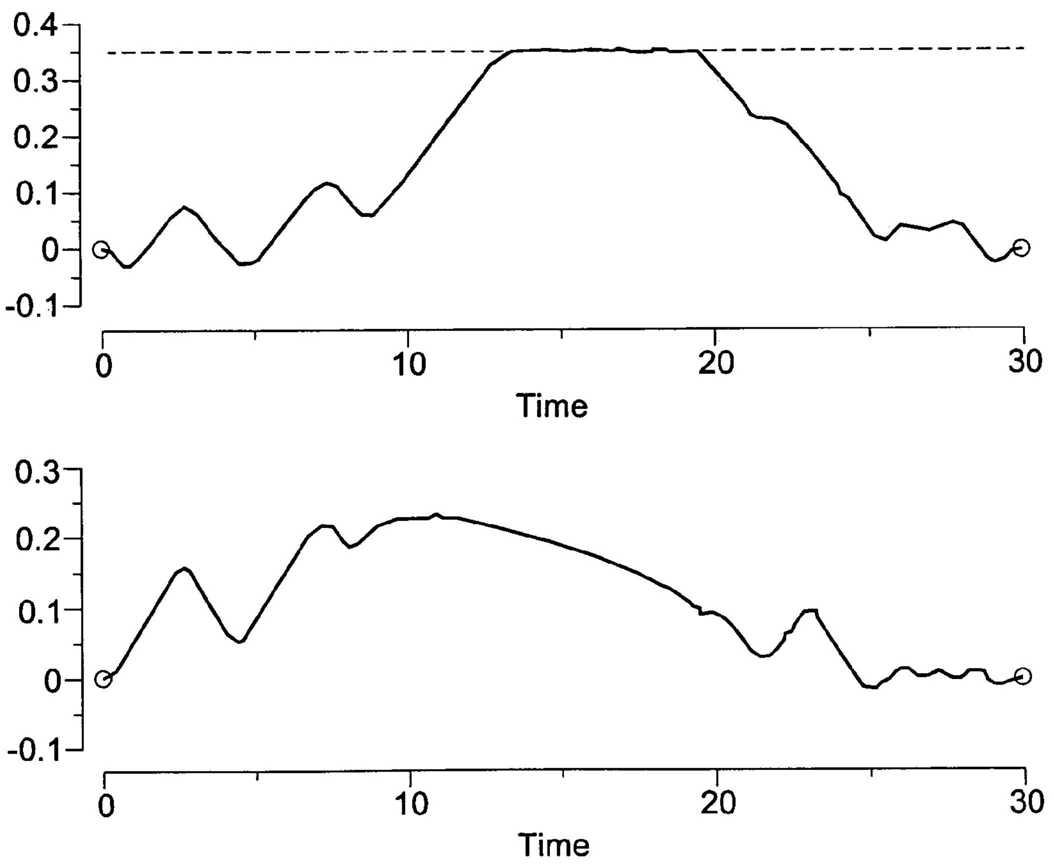

FIG. 10 shows exemplary results for optimal time responses of the control values in fully automated operation. A time horizon of 30 sec is pre-determined. The control functions are continuous functions of time with continuous 1st derivations.

Figure 11:
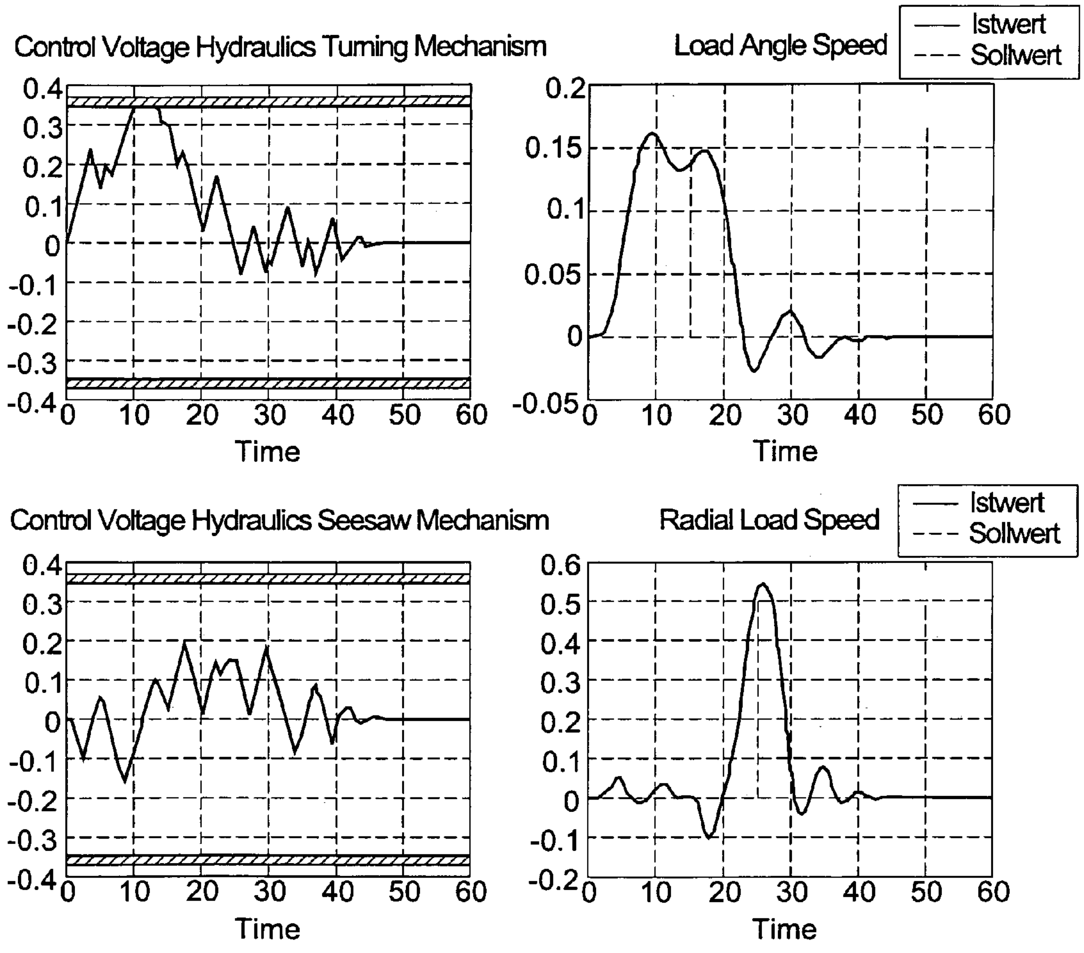

FIG. 11 shows exemplary time responses of control factors and control values for simulated hand lever operations. The set points for load speed (the hand lever pre-determinations) are varied in form of time phased rectangular impulses. The update of the optimal control system is done with a frequency of 0.2 seconds.

The invention claimed is:

1. Crane or excavator for the transaction of a load, which comprises:

a) a load cable for carrying the load, b) a turning mechanism for the rotation of the crane or excavator, c) a seesaw mechanism for the erection or incline of an extension arm and d) a hoisting gear for the lifting or lowering of the load which is carried by a cable with an actuation system, said crane or excavator being further characterized by e) a track control system (31), including a control system (41) for optimized movement and guidance of the load, the control system (41) comprising an optimized control function based on an optimization of control parameters for providing an optimal control trajectory, wherein said control function dynamically calculates time functions for control voltages for moving the load with minimized oscillation amplitudes, and wherein said control parameters include:

i) a plurality of set points as input values for describing a pre-determined position and orientation of the load at one or more load positions along said calculated trajectory from an initial starting point to an end point, and ii) feedback from at least one status variable.

2. Crane or excavator in accordance with claim 1, wherein the track control system 31 includes a model based optimal control trajectory which is calculated and updated in real time.

3. Crane or excavator in accordance with claim 2, wherein the model based optimal control trajectory is based on a model which is linearized by reference trajectories.

4. Crane or excavator in accordance with claim 2, wherein the model based optimal control trajectory is based on a non-linear model approach.

5. Crane or excavator in accordance with claim 2, wherein the model based optimal control trajectory includes feedback of all status values.

6. Crane or excavator in accordance with claim 2, wherein the model based optimal control trajectory includes feedback of at least one measured variable and estimation of the remaining status values.

7. Crane or excavator in accordance with claim 2, wherein the model based optimal control trajectory includes feedback of at least one measured variable and set point tracking of the remaining status values by model based feed forward control.

8. Crane or excavator in accordance with claim 2, wherein the track control system (31) is implemented as fully automatic or as semi-automatic.

9. Crane or excavator in accordance with claim 1, wherein a set point matrix (35) for position and orientation of the load is entered as an input value into the track control system (31).

10. Crane or excavator in accordance with claim 1, wherein the set point matrix (35) comprises a start point and arrival point.

11. Crane or excavator in accordance with claim 1, wherein a desired arrival speed of the load is entered into the track control system (31) by the position of the hand lever (34) in case of a semi-automatic operation.

12. Crane or excavator in accordance with claim 11, wherein measuring values of the positions of crane and load are measured via sensors and entered into the track control system (31) in case of a semi-automatic operation.

13. Crane or excavator in accordance with claim 11, wherein positions of crane and load are estimated in a module for model based estimation processes (43) and entered into the track control system (31).

14. Crane or excavator in accordance with claim 1, wherein the values ($U^{outD}$, $U^{outA}$, $U^{outL}$, $U^{outR}$) are entered first into an underlying control system with load oscillation damping.

15. Crane or excavator in accordance with claim 14, wherein the load oscillation damping system has at least one track planning module, one centripetal force compensation device, one axis controller for the turning mechanism, one axis controller for the seesaw mechanism, one axis controller for the hoisting gear and one axis controller for the turning mechanism.

16. Crane or excavator in accordance with claim 1, wherein the movement of the load can be specified in such a way by the track control system (31), that pre-determine free areas cannot be left by the oscillating load.

17. Crane or excavator in accordance with claim 3, wherein the model based optimal control trajectory includes feedback of all status values.

18. Crane or excavator in accordance with claim 4, wherein the model based optimal control trajectory includes feedback of all status values.

19. Crane or excavator for the transaction of a load, which comprises:

a) a load cable for carrying the load, b) a turning mechanism for the rotation of the crane or excavator, c) a seesaw mechanism for the erection or incline of an extension arm and d) a hoisting gear for the lifting or lowering of the load which is carried by a cable with an actuation system, said crane or excavator being further characterized by e) a track control system (31), including a control system (41) for optimized movement and guidance of the load, the control system (41) comprising an optimized control function based on an optimization of control parameters for providing an optimal control trajectory, wherein said control function dynamically calculates time functions for control voltages for moving the load with minimized oscillation amplitudes, and wherein said control parameters include:

i) a plurality of set points as input values for describing a pre-determined position and orientation of the load at one or more load positions along said calculated trajectory from an initial starting point to an end point, and ii) feedback from at least one status variable.

20. The crane or excavator of claim 19 wherein the track control system (31) includes a model based optimal control trajectory which is calculated and updated in real time.

* * * * *